(12) United States Patent
Kritzler (10) Patent No.: US 7,550,684 B2
(45) Date of Patent: Jun. 23, 2009

(54) PORTABLE HANDHELD ELECTRONIC SCALE

(76) Inventor: Ronald Kritzler, 3370 NE. 190th St., #1404, Aventura, FL (US) 33180

( * ) Notice: Subject to any disclaimer, the term of this patent is extended or adjusted under 35 U.S.C. 154(b) by 0 days.

(21) Appl. No.: 12/058,179

(22) Filed: Mar. 28, 2008

(65) Prior Publication Data

US 2008/0251298 A1  Oct. 16, 2008

Related U.S. Application Data

(60) Provisional application No. 60/986,357, filed on Nov. 8, 2007, provisional application No. 60/911,239, filed on Apr. 11, 2007.

(51) Int. Cl.
*G01G 21/00* (2006.01)
(52) U.S. Cl. ...................... 177/148; 177/245
(58) Field of Classification Search ................. 177/131, 177/148, 149, 245
See application file for complete search history.

(56) References Cited

U.S. PATENT DOCUMENTS

| | | | | |
|---|---|---|---|---|
| 2,518,973 A * | 8/1950 | Atherton | ...................... | 190/102 |
| 4,424,841 A * | 1/1984 | Smith | ........................... | 224/240 |
| 4,936,399 A * | 6/1990 | Christman et al. | ...... | 177/210 C |
| 5,031,710 A * | 7/1991 | Parker et al. | ............ | 177/210 FP |
| 5,467,743 A * | 11/1995 | Doose | ........................ | 119/864 |
| 5,873,504 A * | 2/1999 | Farmer | ....................... | 224/576 |
| 5,964,384 A * | 10/1999 | Young | .......................... | 224/153 |
| 6,429,391 B1 * | 8/2002 | Gruver | ........................ | 177/148 |
| 7,271,353 B1 * | 9/2007 | Lewis | .......................... | 177/131 |
| 7,281,615 B2 * | 10/2007 | Siwak et al. | ................... | 190/39 |
| 7,378,604 B2 * | 5/2008 | Truong | ......................... | 177/131 |
| 2001/0020935 A1 | 9/2001 | Gelbman | | |
| 2002/0014955 A1 | 2/2002 | Klitsgaard | | |
| 2002/0167500 A1 | 11/2002 | Gelbman | | |
| 2002/0191998 A1 | 12/2002 | Cremon et al. | | |
| 2003/0070331 A1 | 4/2003 | Chen | | |
| 2003/0160482 A1 | 8/2003 | Yanai | | |
| 2004/0016614 A1 | 1/2004 | Chou | | |
| 2004/0226996 A1 | 11/2004 | Stefani | | |
| 2005/0051586 A1 | 3/2005 | Siwak et al. | | |
| 2005/0077778 A1 | 4/2005 | Lin et al. | | |
| 2005/0103590 A1 | 5/2005 | Hu | | |
| 2005/0150733 A1 | 7/2005 | Chen | | |
| 2005/0182557 A1 | 8/2005 | Smith et al. | | |
| 2005/0192701 A1 | 9/2005 | Ben-Ezra | | |
| 2005/0217903 A1 | 10/2005 | Roberts et al. | | |

(Continued)

*Primary Examiner*—Randy W Gibson
(74) *Attorney, Agent, or Firm*—Laurence A. Greenberg; Werner H. Stemer; Ralph E. Locher (57) ABSTRACT

A portable handheld electronic scale can weigh luggage and other objects. The scale includes an electronic weight-measuring device configured to measure and indicate the weight of the luggage. If the weight of the item of luggage exceeds the weight restriction of an airline, the traveler can reduce the weight of the item of luggage below the weight limit set by the airline by removing some of the contents of the item of luggage. Depending upon the particular embodiment of the scale, a user can comfortably hold the scale either parallel or perpendicular to the ground when the scale is used to lift the item of luggage off of a ground surface in order to obtain the weight of the item of luggage. An audible signal may be given when the measured weight is fixed on a display and/or when it is greater than a set limit.

16 Claims, 6 Drawing Sheets

U.S. PATENT DOCUMENTS

| | | |
|---|---|---|
| 2005/0217904 A1 | 10/2005 | Hughes |
| 2005/0224261 A1* | 10/2005 | Marks .................. 177/131 |
| 2005/0254776 A1 | 11/2005 | Morrison et al. |
| 2005/0288937 A1 | 12/2005 | Verdiramo |
| 2006/0054364 A1 | 3/2006 | Kamakau |
| 2006/0133653 A1 | 6/2006 | Sznba |
| 2006/0169787 A1 | 8/2006 | Gelbman |
| 2006/0196708 A1 | 9/2006 | Keech et al. |
| 2006/0266563 A1* | 11/2006 | Kaplan .................. 177/245 |
| 2007/0007048 A1 | 1/2007 | Gill |
| 2007/0012106 A1 | 1/2007 | Mardirossian |
| 2007/0024551 A1 | 2/2007 | Gelbman |
| 2007/0045011 A1 | 3/2007 | Dittrich et al. |
| 2007/0054596 A1 | 3/2007 | Bianco |
| 2007/0056779 A1* | 3/2007 | Laniado et al. .......... 177/245 |
| 2007/0107947 A1 | 5/2007 | Truong |
| 2007/0136075 A1 | 6/2007 | Lowes et al. |
| 2007/0205025 A1 | 9/2007 | Taha |
| 2007/0209843 A1 | 9/2007 | Hannon |
| 2007/0290473 A1 | 12/2007 | Buma |
| 2008/0000742 A1 | 1/2008 | Lee et al. |
| 2008/0011568 A1 | 1/2008 | Siwak et al. |
| 2008/0042460 A1 | 2/2008 | Fuchs |
| 2008/0047114 A1 | 2/2008 | Wu et al. |
| 2008/0064522 A1 | 3/2008 | Watkins et al. |

* cited by examiner

PORTABLE HANDHELD ELECTRONIC SCALE

CROSS-REFERENCE TO RELATED APPLICATIONS

This application claims the benefit under 35 U.S.C. § 119 (e) of provisional application No. 60/911,239 filed Apr. 11, 2007 and of provisional application No. 60/986,357 filed Nov. 8, 2007. As far as possible under the rules, provisional application No. 60/911,239 and provisional application No. 60/986,357 are herewith entirely incorporated by reference.

BACKGROUND OF THE INVENTION

1. Field of the Invention

The invention relates to a portable handheld electronic scale that can weigh a variety of objects, such as, for example, suitcases, packages that will be mailed or otherwise transported, and/or animals.

2. Description of the Related Art

It is known to use a portable handheld electronic scale to weigh a fish. As an example, a scale has been constructed with moveable jaws that are clamped onto the jawbone of a fish in order to weigh the fish. The jaws are then removed from the jawbone of the fish after the fish has been weighed. This scale cannot be used to weigh other types of items because of the specially constructed jaws that clamp onto the jawbone of the fish. Additionally, a typical digital fishing scale can only register a maximum weight of 35 pounds.

BRIEF SUMMARY OF THE INVENTION

It is an object of the invention to provide a portable handheld electronic scale that a traveler can use, before he/she goes to the airport, to weigh a piece of luggage in order to determine whether the weight of the piece of luggage exceeds the weight restriction of an airline. If the weight of the piece of luggage does exceed the weight restriction of the airline, the traveler can reduce the weight of the luggage below the weight limit set by the airline by removing some of the contents of the piece of luggage. In this manner, the traveler can make sure that he/she will not have to pay a luggage overweight fee to the airline.

It is another object of the invention to provide a scale with a support assembly configured to connect various types of attachments to the weight sensor of the scale so that different types of objects of various sizes can be weighed. One example of a type of attachment is a strap arrangement that can be attached to the handle of a piece of luggage in order to weigh the piece of luggage. Another example of a type of attachment is a strap arrangement that can be adjustably placed around a parcel so that parcels of various sizes can be weighed. Yet another example of a type of attachment is an animal harness that can be placed under the belly of an animal so that a veterinarian can determine the weight of the animal. An additional example of a type of attachment is a hook that can support the handle of a piece of luggage or of another type of item. The hook can also be used to weigh a fish. By providing different types of attachments, the scale serves multiple purposes.

With the foregoing and other objects in view there is provided, in accordance with the invention, a first embodiment of a portable handheld scale for weighing an object. The first embodiment of the scale includes a housing formed with a portion serving as a handle. The housing extends along a longitudinal axis, and the handle extends along the longitudinal axis. The scale includes an electronic weight-measuring device configured to measure and indicate a weight of the object. The weight-measuring device includes a weight sensor for measuring the weight of the object, and the weight-measuring device is disposed in the housing. The scale also includes a support assembly configured to support the object to be weighed. The support assembly is attached to the weight sensor. The support assembly includes a strap having a first end with a first connector and a second end with a second connector that mates with the first connector.

With the foregoing and other objects in view there is provided, in accordance with the invention, a second embodiment of a portable handheld scale for weighing an object. The second embodiment of the scale includes a housing that extends along a longitudinal axis. The housing is formed with an aperture, and a handle attached to the housing. The second embodiment of the scale includes an electronic weight-measuring device configured to measure and indicate the weight of the object. The weight-measuring device includes a weight sensor for measuring the weight of the object, and the weight-measuring device is disposed in the housing. The second embodiment of the scale includes a support assembly configured to support the object to be weighed. The support assembly is attached to the weight sensor. The support assembly extends through the aperture. The weight-measuring device includes a display configured to indicate the weight measured by the weight sensor. The weight-measuring device includes a transducer configured to provide an audible signal after the weight-measuring device has completed determining the weight of the object and after the weight of the object being shown on the display is fixed.

Other features which are considered as characteristic for the invention are set forth in the appended claims.

Although the invention is illustrated and described herein as embodied in a portable electronic handheld scale, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS OF THE INVENTION

Figure 1:
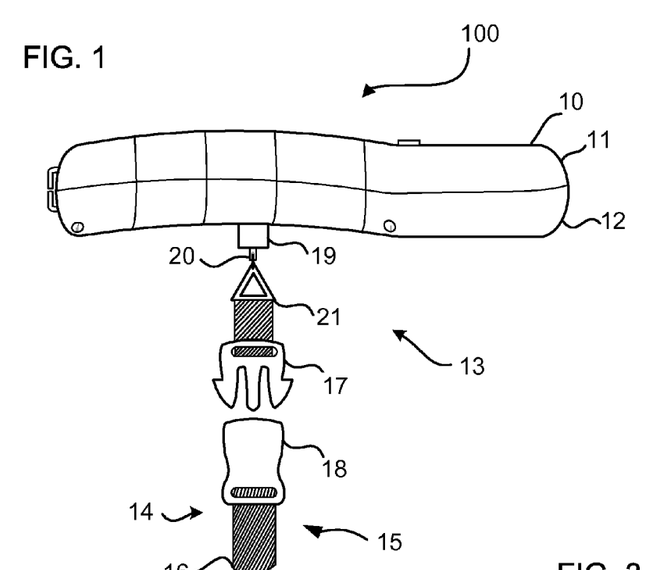
FIG. 1 is a side view of a first exemplary embodiment of a portable handheld electronic scale.

Referring now to the figures of the drawing in detail and first, particularly, to FIG. 1 thereof, there is shown a side view of a first exemplary embodiment of a portable handheld electronic scale 100. The scale 100 includes a housing 10 that is preferably formed from a plastic upper housing piece 11 and a plastic lower housing piece 12. It should be understood however, that the housing 10 could alternatively be formed from other materials and from any number of housing pieces. A weight sensor 29 (shown in FIG. 5) is located within the housing 10 and therefore cannot be seen in FIG. 1. The weight sensor 29 has a property that can be monitored to provide an indication of the weight of the object being weighed. A support assembly 13 extends through an opening 33 (shown in FIG. 2) in the lower housing piece 12 and is connected to the weight sensor 29 that is in the housing 10. The support assembly 13 supports the object that will be weighed. The support assembly 13 may include an attachment 14 that assists in supporting the object being weighed. The attachment 14 could be designed to be removable from the other parts of the support assembly 13 so that after being removed, a differently constructed attachment 14 could be connected to the other parts of the support assembly 13. The attachment 14 that is selected can be the one that will optimally support a particular type of object that will be weighed. In this way, the attachment 14 that is used is selected from a plurality of attachments.

FIG. 1 shows one version of the attachment 14, which is implemented as a strap assembly 15 that includes a strap 16, a male connector 17 and a mating female connector 18. One end of the strap 16 is attached to the male connector 17 and the other end of the strap 16 is attached to the female connector 18. The strap 16 of the strap assembly 15 can be placed around the handle of a piece of luggage, and the male connector 17 and the female connector 18 can be interlocked so that the piece of luggage can be securely supported by the scale 100 when the scale 100 is held in the hand of a person. The strap 16 could be made of nylon, elastic, rubber, a fabric material, or any other suitable material or combination of materials. The strap 16 is preferably constructed as a flat strap in order to support the handle of the piece of luggage in a stable manner. The strap 16 could alternatively be constructed from one or more cords, for example.

An elongated grommet 19 may be fitted in the opening 33 (FIG. 2) formed in the lower housing piece 12. The grommet 19 provides a channel that laterally limits the movement of the support assembly 13 so that the support assembly 13 extends substantially perpendicularly through the opening 33 in the lower housing piece 12 and remains substantially perpendicular with respect to the housing 10. The support assembly 13 may be implemented in any number of ways as will now be apparent to one of ordinary skill in the art. For example, the support assembly 13 may include a rod 20 and a triangular piece 21 that are linked together. In this case, the rod 20 is connected to the weight sensor 29, and the triangular piece 21 is attached to the strap 16.

Figure 2:
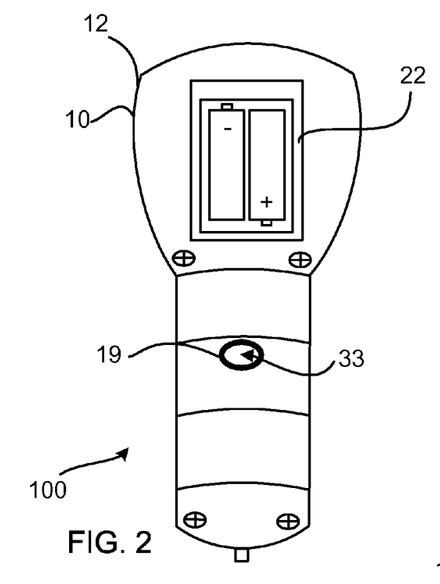
FIG. 2 is a bottom view of the first exemplary embodiment of the scale.

FIG. 2 is a bottom view of the lower housing piece 12 of the housing 10 of the scale 100. A battery compartment 22 is formed in the lower housing piece 12 in order to hold batteries that will power the scale 100. The grommet 19, which is fitted in the opening 33 formed in the lower housing piece 12, can also be seen in this view. The support assembly 13, however, has not been shown in FIG. 2.

Figure 3:
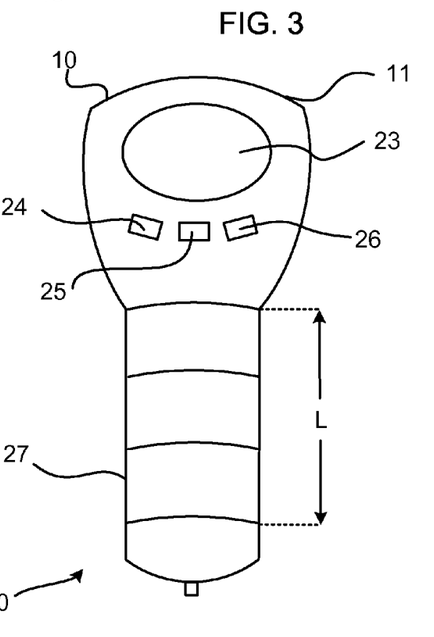
FIG. 3 is a top view of the first exemplary embodiment of the scale.

FIG. 3 is a top view of the upper housing piece 11 of the housing 10 of the scale 100. A display 23 is fitted in the upper housing piece 11 to show the weight of the object being measured by the weight sensor 29. One or more buttons 24, 25, and 26 can be used to turn on the scale 100 and to control certain features that will be subsequently described. The housing 10 is constructed with a handle 27 having a length L. A user or person can grasp the handle 27 such that the support assembly 13 (FIG. 1) extends between two fingers, preferably between the middle two fingers. This locates the center of gravity of the object being weighed approximately in the center of the hand of the user, which makes it easier for the user to support the weight of the object while the weight sensor 29 of the scale 100 is measuring the weight of the object. When the user weighs the object, the scale 100 is preferably held substantially parallel to the ground. If the object being weighed is too heavy to be supported by one hand, then two hands can be used. In this case, one hand can be located on one side of the support assembly 13 and the other hand can be located on the other side of the support assembly 13. The center of gravity of the object being weighed would then be located between the two hands of the user.

Figure 4:
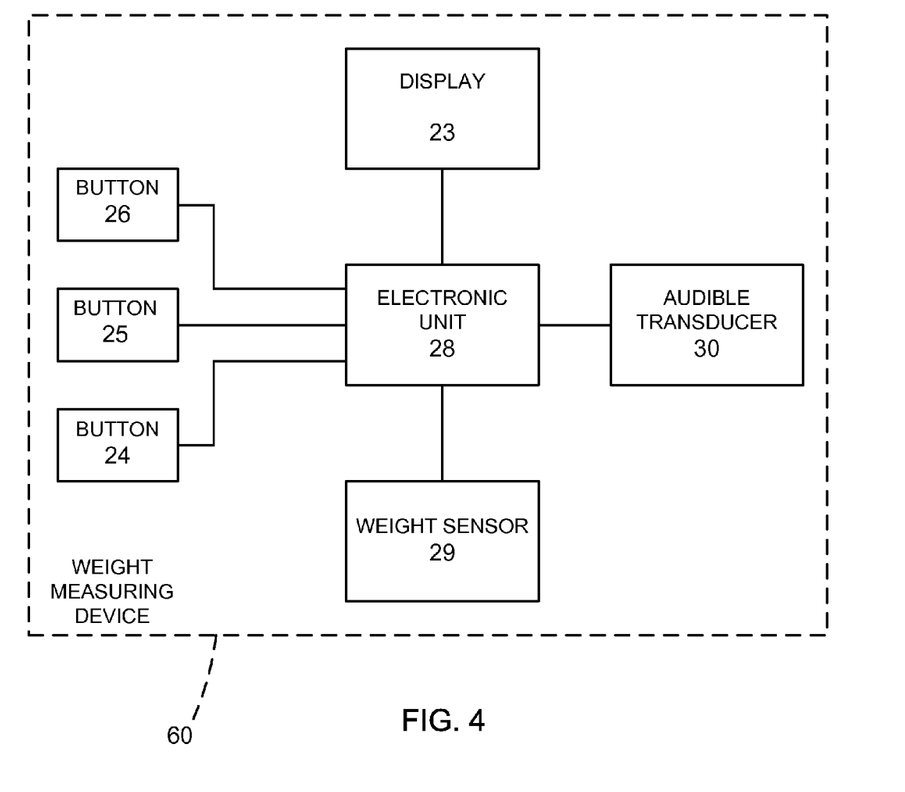
FIG. 4 is a block diagram of a weight-measuring device.

FIG. 4 is a block diagram of an electronic weight-measuring device 60 for determining and indicating the weight of an object. The weight-measuring device 60 includes a weight sensor 29, an electronic unit 28, and one or more buttons 24, 25, and 26 used to control the functions or operation of the electronic unit 28. The weight sensor 29 has not been shown in FIGS. 1-3, however the attachment between the weight sensor 29 and the support assembly 13 has been previously described. The weight sensor 29 can be any suitable transducer having a property that changes in proportion to the weight applied thereto. Such a weight-dependent property could be, for example, resistance, capacitance or any other physical property. A preferred weight sensor 29 is a weight cell that has a weight-dependent capacitance and that can weigh up to 100 pounds. The electronic unit 28 obtains and processes the weight-dependent property of the weight sensor 29 in order to determine the weight of the object.

The weight-measuring device 60 may include a display 23 for displaying the weight of the object. The electronic unit 28 then outputs the appropriate signals to the display 23 in order to display the weight of the object. Alternatively or in addition to the display 23, the weight-measuring device 60 may include an audible transducer 30, which could be, for example, a speaker. The audible transducer 30 may be configured to provide an audible indication of the weight of the object.

The electronic unit 28 could be constructed from discrete components, but preferably includes a suitable microcontroller or microprocessor. The electronic unit 28 can be constructed or configured to indicate that it has completed determining the weight of the object, and that the weight currently being shown on the display 23 is locked or fixed and is the correct weight of the object. For example, the electronic unit 28 could cause the weight reading shown on the display 23 to blink or flash until the correct weight of the object is indicated. Alternatively, the weight reading shown on the display 23 could start blinking or flashing when the correct weight of the object is indicated. A preferred option, which may be used instead of or in addition to the visual indication, is to provide an audible indication that the weight currently being shown on the display 23 is locked or fixed and is the correct weight of the object. In this case, the weight-measuring device 60 will fix the weight reading shown on the display 23 so that the weight reading will not change when the correct weight of the object has been determined, and the electronic unit 28 will output a signal to the audible transducer 30. The audible transducer 30 will then make a sound or play a tune to indicate that the correct weight of the object is shown and is fixed or locked on the display 23. Since the weight reading is now fixed, the user no longer has to support the weight of the object. The user can lower the object and then read the weight of the object that is indicated on the display 23. The audible transducer 30 may simply be a buzzer if the weight-measuring device will be configured to only provide an audible indication when the correct weight of the object is shown on the display 23.

The functions of the electronic unit 28 could be controlled in a variety of different ways and the invention should not be construed as being limited to any one particular way. The following description of the functions of the buttons 24, 25, and 26 are provided merely as examples. Button 24 could turn the scale 100 on and off. Button 25 could select the measurement unit that is used to indicate the weight of the object, for example, pounds or kilograms. Button 26 could reset the weight being displayed and indicate to the electronic unit 28 that a new weight reading from the weight sensor 29 should be obtained. The electronic components of the scale 100, for example, the weight sensor 29, the electronic unit 28, and the display 23 are supplied with power by the batteries located in the battery compartment 22 (FIG. 2) in the lower housing piece 12.

Figure 5:
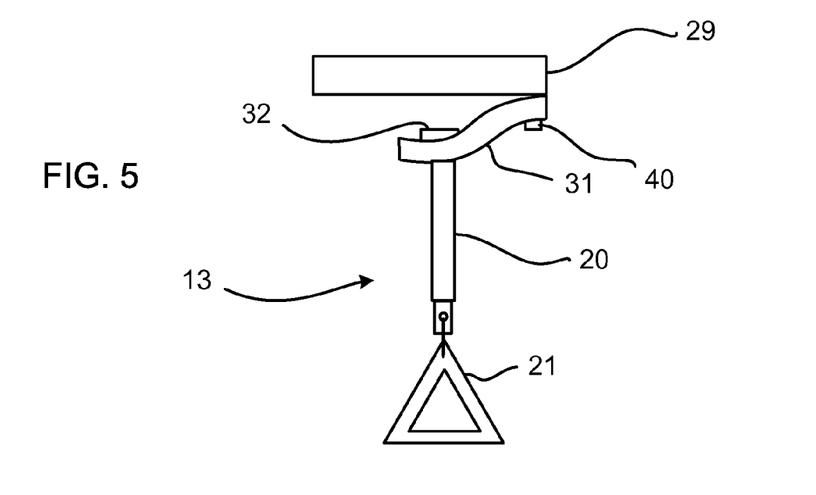
FIG. 5 is a view showing an example of attaching a support assembly to the weight sensor.

FIG. 5 is a view showing an example of attaching a support assembly 13 to the weight sensor 29. In this example, the support assembly 13 includes a rod 20 that has one end formed with a flange 32. One end of the rod 20 is attached to a triangular piece 21, which is attached to the strap 16 (shown in FIG. 1). A coupling element 31 is formed with a respective hole at each opposite end. The coupling element 31 is attached to the weight sensor 29 by placing a screw 40 through one of the holes and by threading the screw into a threaded hole in the weight sensor 29. The rod 20 is placed through the other hole of the coupling element 31, and the flange 32 of the rod 20 is supported against the coupling element 31. In this manner, the force due to the weight of the object being weighed is transmitted to the weight sensor 29. The inside of the housing 10 is formed with an appropriate supporting structure to support and fix the weight sensor 29 within the housing 10.

Figure 6:
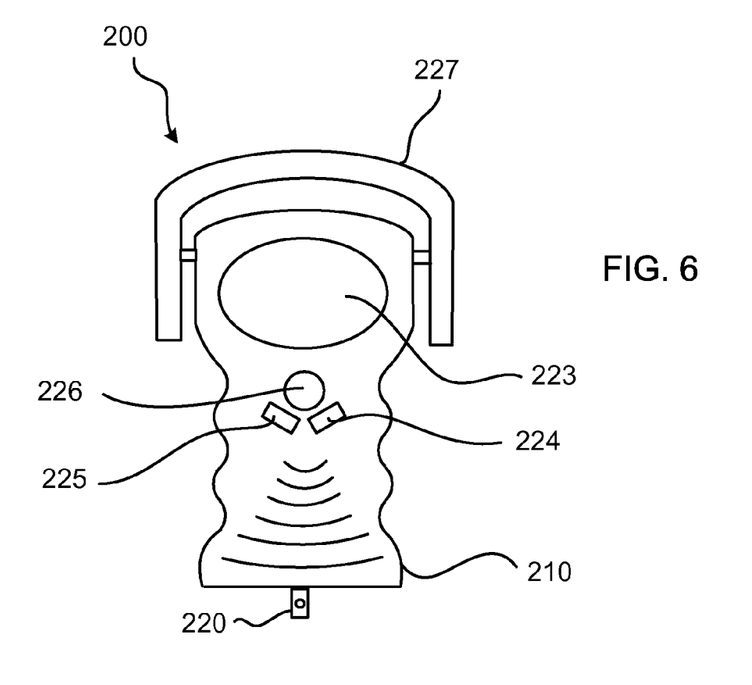
FIG. 6 is a front view of a second exemplary embodiment of a portable handheld electronic scale.

FIG. 6 is a front view of a second exemplary embodiment of a handheld scale 200. The scale 200 includes a display 223 and buttons 224, 225, and 226 that function similarly to the corresponding components of the first exemplary embodiment of the scale 100. The scale 200 also includes a non-illustrated electronic unit, audible transducer, and battery compartment, which respectively function similarly to the electronic unit 28, audible transducer 30, and battery compartment 22 of the first exemplary embodiment of the handheld scale 100. The scale 200 additionally includes a weight sensor 229 (shown in FIG. 7) functioning similarly to the weight sensor 29 of the first exemplary embodiment of the handheld scale 100.

The scale 200 is designed so it can be held substantially perpendicular to the ground while the weight of an object is measured, whereas the first exemplary embodiment of the handheld scale 100 is designed so it can be held substantially parallel to the ground while the weight of an object is measured. The scale 200 is held from a pivotable handle 227 attached near the top of the scale 200. In this second embodiment, the top is located at one longitudinal end of the housing 210, and the bottom is located at the other longitudinal end of the housing 210. The weight sensor 229 (shown in FIG. 7) is configured near the bottom of the scale 200. The rod 220 can be seen extending through a hole formed in the housing 210 at the bottom.

Figure 7:
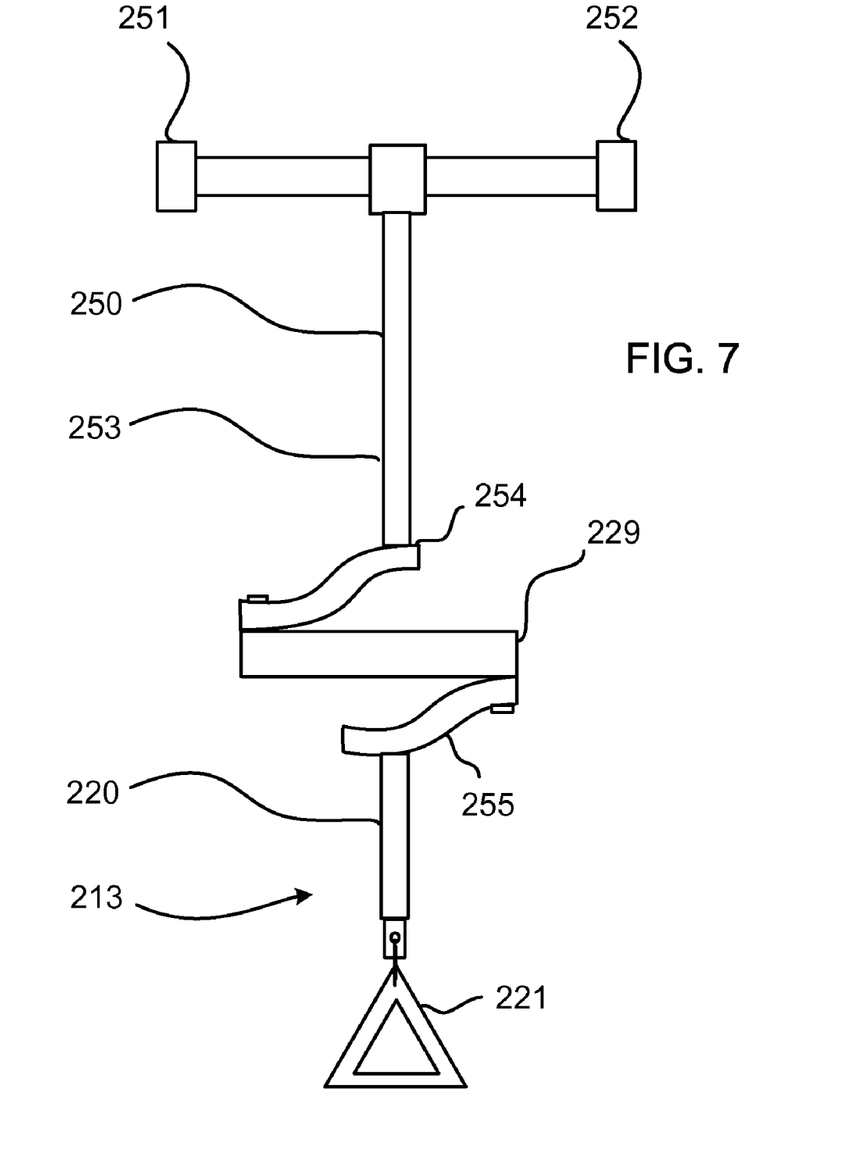
FIG. 7 is a view of the internal components of the second exemplary embodiment of the scale that support and measure the weight of the object being weighed.

FIG. 7 is a view showing an example of some of the components of the scale 200 that can be used to support and measure the weight of the object being weighed. The lateral ends 251, 252 of a T-bar 250 extend through and are supported by non-illustrated cooperating holes formed in the sides of the housing 210. The handle 227 (FIG. 6) is fitted onto the lateral ends 251, 252 of the T-bar 250. A longitudinal portion 253 of the T-bar 250 is attached to a coupling element 254 by a weld, for example. The coupling element 254 is screwed onto the top of the weight sensor 229. The bottom of the weight sensor 229 is screwed onto another coupling element 255, and the coupling element 255 is attached to the rod 220 of the support assembly 213. The support assembly 213 also includes a triangular piece 221 linked to the rod 220. The triangular piece 221 is connected to an attachment in a manner similar to that described with regard to the attachment 14 described with the first embodiment of the scale 100.

Figure 8:
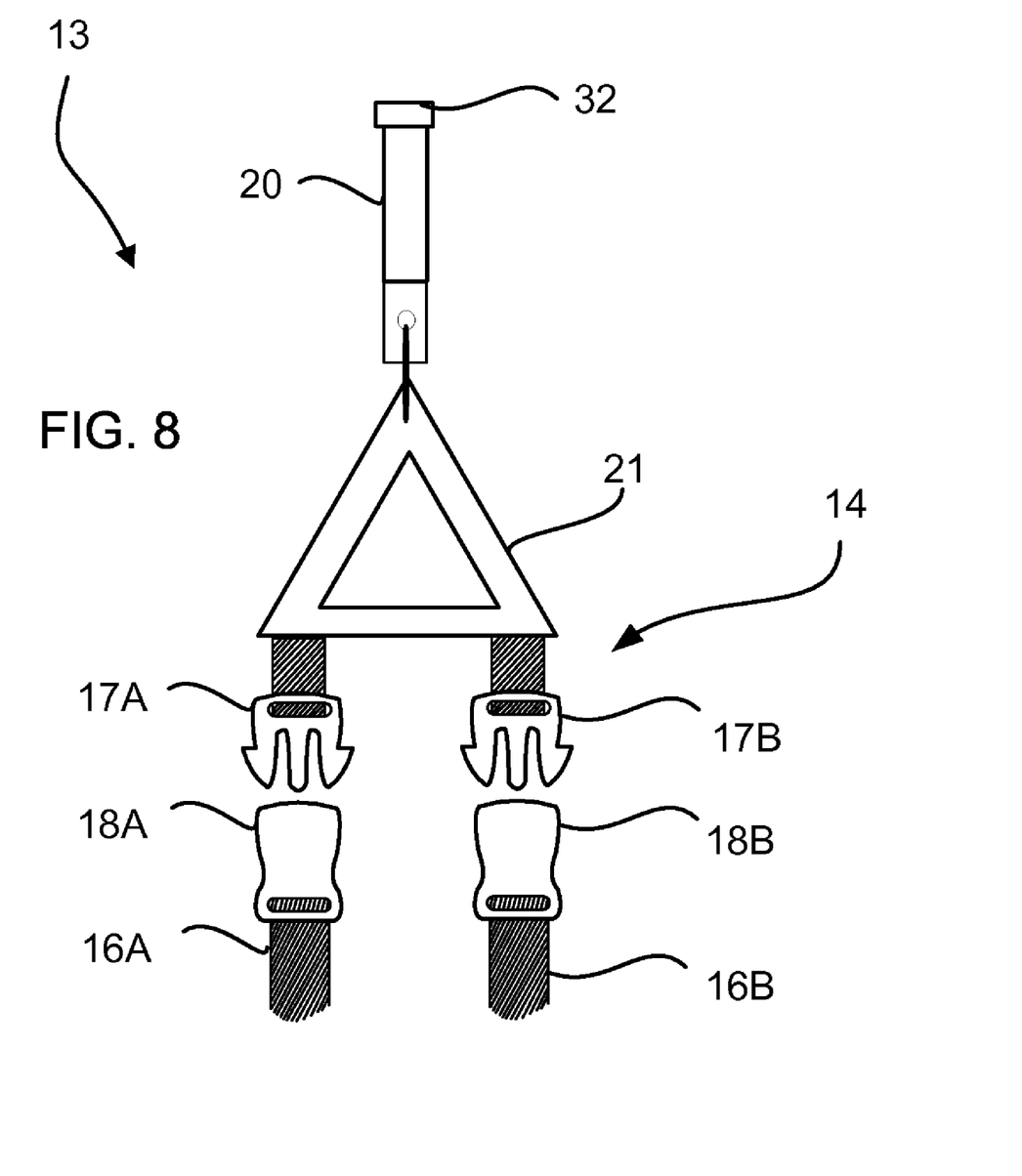
FIG. 8 is a view showing another version of the attachment.

FIG. 8 shows an example of another version of the attachment 14, which is implemented as a dual strap assembly. The middle portion of each strap 16A and 16B is attached perhaps, for example, by an appropriate stitching, to the triangular piece 21 of the support assembly 13. In this example, the support assembly 13 includes the rod 20 with the flange 32, which has been described in FIG. 5, however the support assembly 13 could also be constructed in other ways. One end of each strap 16A, 16B is attached to a male connector 17A, 17B, and the other end of each strap 16A, 16B is attached to a female connector 18A, 18B. The open straps 16A and 16B could be spaced apart, led around an object, such as a parcel, for example, and then closed by mating each male connector 17A, 17B to the corresponding female connector 18A, 18B. By running across opposite edges of the bottom of the parcel, the straps 16A, 16B will support the parcel in a stable and secure manner so that the weight of the parcel can be determined.

Figure 9:
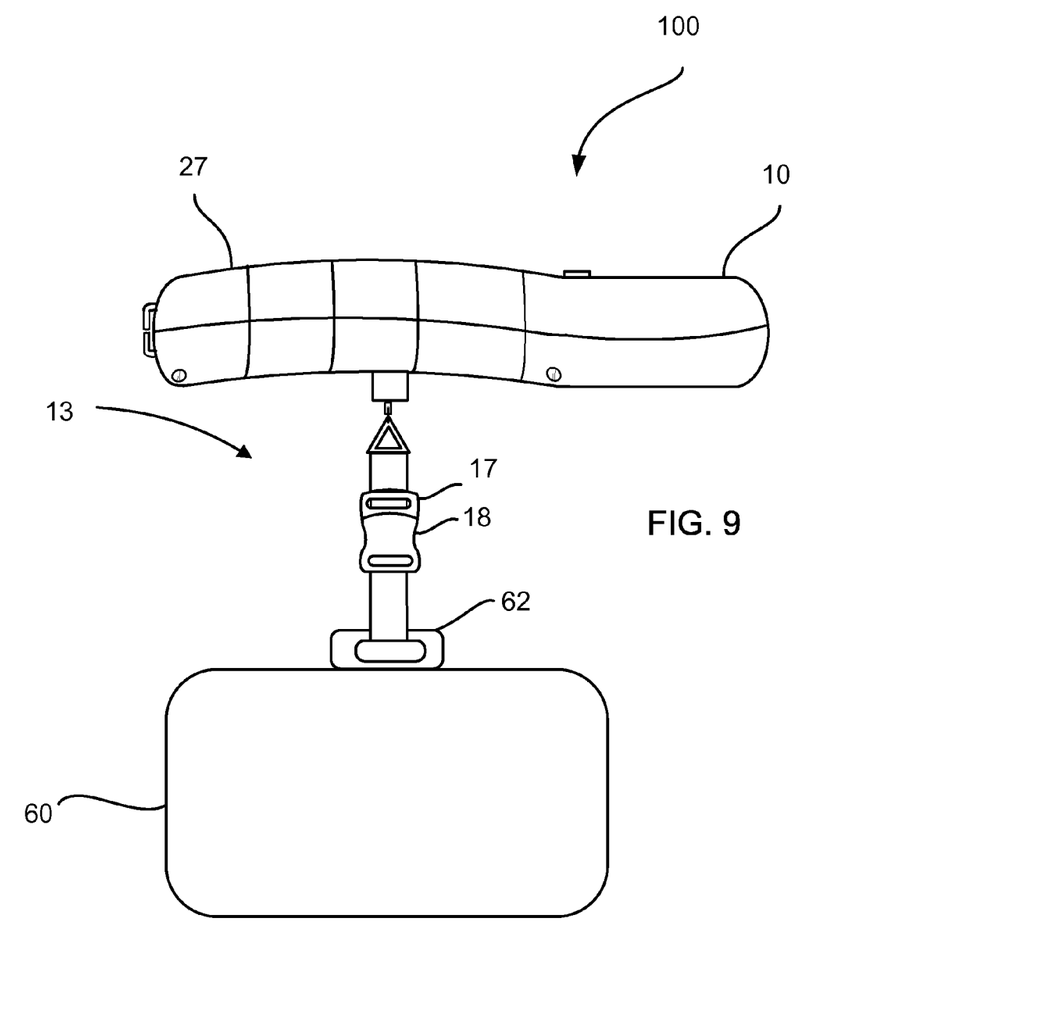
FIG. 9 is a side view showing an example of the support assembly of the first embodiment of the scale supporting an object that will be weighed.

FIG. 9 is a side view showing an example of the support assembly 13 of the first embodiment of the scale 100 supporting an object that will be weighed. The object is shown as an item of luggage or a suitcase 61 in this example. The size of the scale 100 relative to the suitcase 61 has been exaggerated in order to more clearly show the features of the scale 100. The strap 16 of the support assembly 13 is placed around the handle 62 of the suitcase 61, and the male connector 17 is mated into the female connector 18. The user makes sure that the scale 100 is turned on and is ready to take a weight measurement. The user then grasps and holds the handle 27 of the scale 100 so that the housing 10 of the scale is substantially parallel to the ground, and the user then raises the suitcase 61 off of the ground. When the weight-measuring device 60 has determined the weight of the suitcase 61, an indication of the weight will be given by the display 23 and/or by the audible transducer 30 and the user will know whether the weight of the suitcase 61 is above or below the weight limit set by the airline. If the weight of the suitcase 61 is above the weight limit set by the airline, some of the contents of the suitcase 61 can be removed and then another weight measurement can be taken to see if the weight of the suitcase 61 is now below the weight limit set by the airline.

I claim:

1. A portable handheld scale for weighing an object, the scale comprising:
    a housing formed with a portion serving as a handle, said housing extending along a longitudinal axis, said handle extending along the longitudinal axis;
    an electronic weight-measuring device configured to measure and indicate a weight of the object, said weight-measuring device including a weight sensor for measuring the weight of the object, said weight-measuring device disposed in said housing; and
    a support assembly configured to support the object to be weighed, said support assembly attached to said weight sensor, said support assembly including a strap having a first end with a male connector and a second end with a female connector configured to mate with said male connector of said first end of said strap in order to weigh the object;
    said weight-measuring device including a display configured to indicate the weight measured by said weight sensor;
    said display being disposed in said housing;
    said housing having an elongated top side extending along said longitudinal axis and an opposite elongated bottom side extending along said longitudinal axis; and
    said display being located in said top side, said bottom side including a central region with an aperture formed therein, and said support assembly extending through said aperture in said bottom side.

2. The scale according to claim 1, wherein said support assembly extends in a direction transverse to said longitudinal axis.

3. The scale according to claim 1, wherein said support assembly is configured to connect to a plurality of different types of attachments for weighing different types of objects.

4. The scale according to claim 1, wherein said weight sensor includes a capacitive load cell configured to measure the weight of the object.

5. The scale according to claim 1, wherein:
    said weight-measuring device includes a transducer that provides an audible signal; and
    said transducer is configured to provide the audible signal after said weight-measuring device has completed determining the weight of the object and after the weight of the object being shown on the display is fixed.

6. The scale according to claim 1, wherein:
    after said weight-measuring device has completed determining the weight of the object and after the weight of the object being shown on the display is fixed, said display provides a visual indication in addition to displaying the weight of the object.

7. The scale according to claim 1, wherein:
    said weight-measuring device is configured to operate in a mode in which a weight limit can be set; and
    when the weight of the object is greater than the weight limit, said weight-measuring device provides a visual indication in addition to displaying the weight of the object.

8. The scale according to claim 1, wherein said weight-measuring device includes a transducer for providing an audible signal, said weight-measuring device is configured to operate in a mode in which a weight limit can be set, and said transducer provides the audible signal when the weight of the object is greater than the weight limit.

9. A portable handheld scale for weighing an object, the scale comprising:
    a housing formed with a portion serving as a handle, said housing extending along a longitudinal axis, said handle extending along the longitudinal axis;
    an electronic weight-measuring device configured to measure and indicate a weight of the object, said weight-measuring device including a weight sensor for measuring the weight of the object, said weight-measuring device disposed in said housing; and
    a support assembly configured to support the object to be weighed, said support assembly attached to said weight sensor, said support assembly including a strap having a first end with a first connector and a second end with a second connector configured to mate with said first connector of said first end of said strap in order to weigh the object;
    said weight-measuring device including a display configured to indicate the weight measured by said weight sensor, said display disposed in said housing, said housing having an elongated top side extending along said longitudinal axis and an opposite elongated bottom side extending along said longitudinal axis, said display located in said top side, said bottom side including a central region with an aperture formed therein, and said support assembly extending through said aperture in said bottom side.

10. The scale according to claim 9, wherein said support assembly extends in a direction transverse to said longitudinal axis.

11. The scale according to claim 9, wherein said support assembly is configured to connect to a plurality of different types of attachments for weighing different types of objects.

12. The scale according to claim 9, wherein said weight sensor includes a capacitive load cell configured to measure the weight of the object.

13. The scale according to claim 9, wherein:
    said weight-measuring device includes a transducer that provides an audible signal; and
    said transducer is configured to provide the audible signal after said weight-measuring device has completed determining the weight of the object and after the weight of the object being shown on the display is fixed.

14. The scale according to claim 9, wherein:
    after said weight-measuring device has completed determining the weight of the object and after the weight of the object being shown on the display is fixed, said display provides a visual indication in addition to displaying the weight of the object.

15. The scale according to claim 9, wherein:
    said weight-measuring device is configured to operate in a mode in which a weight limit can be set; and
    when the weight of the object is greater than the weight limit, said weight-measuring device provides a visual indication in addition to displaying the weight of the object.

16. The scale according to claim 9, wherein said weight-measuring device includes a transducer for providing an audible signal, said weight-measuring device is configured to operate in a mode in which a weight limit can be set, and said transducer provides the audible signal when the weight of the object is greater than the weight limit.

* * * * *